(12) United States Patent
Muramatsu et al.

(10) Patent No.: US 6,264,181 B1
(45) Date of Patent: Jul. 24, 2001

(54) PNEUMATICALLY OPERATED ACTIVE VIBRATION DAMPING DEVICE HAVING AIR CHAMBER WHOSE VOLUME IS CONTROLLABLE

(75) Inventors: Atsushi Muramatsu; Hiroyuki Ichikawa, both of Komaki (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/541,467

(22) Filed: Mar. 31, 2000

(30) Foreign Application Priority Data

Apr. 20, 1999 (JP) .................................................. 11-112902

(51) Int. Cl.[7] .................................. F16F 5/00; F16F 9/00
(52) U.S. Cl. ................ 267/140.14; 267/267; 267/140.13
(58) Field of Search .......................... 267/140.11, 140.13, 267/140.14

(56) References Cited

U.S. PATENT DOCUMENTS

| 4,840,358 | 6/1989 | Hoying et al. ..................... 267/140.1 |
| 5,170,998 | * 12/1992 | Muramatsu ..................... 267/140.13 |
| 5,174,552 | * 12/1992 | Hodgson et al. ............... 267/140.11 |
| 5,215,293 | * 6/1993 | Muramatsu et al. ............ 267/140.14 |
| 5,215,294 | * 6/1993 | Muramatsu et al. ............ 267/140.13 |
| 5,246,212 | * 9/1993 | Funahashi et al. ............. 267/140.13 |
| 5,314,173 | * 5/1994 | Ide et al. ......................... 267/140.14 |
| 6,082,717 | * 7/2000 | Nanno ............................. 267/140.14 |

FOREIGN PATENT DOCUMENTS

| 60-8540 | 1/1985 | (JP) . |
| 61-2939 | 1/1986 | (JP) . |
| 61-191543 | 11/1986 | (JP) . |

* cited by examiner

Primary Examiner—Christopher P. Schwartz
(74) Attorney, Agent, or Firm—Rossi & Associates

(57) ABSTRACT

A pneumatically operated active vibration damping device is disclosed, which comprises: a first and a second mounting member which are spaced apart from each other and are attachable to a two members of a vibration system; an elastic body elastically connecting the first and second mounting member; a working air chamber adapted to apply an oscillating force between the first and second mounting member, based on a periodic change of an air pressure in the working air chamber; and a volume regulator adapted to regulate a volume of the working air chamber.

19 Claims, 7 Drawing Sheets

PNEUMATICALLY OPERATED ACTIVE VIBRATION DAMPING DEVICE HAVING AIR CHAMBER WHOSE VOLUME IS CONTROLLABLE

BACKGROUND OF THE INVENTION

1. Field of the Invention

The present invention relates generally to an active vibration damping device which is interposed between two members of a vibration system for connecting these two members or mounting one of these members on the other member in a vibration damping manner, so as to actively damp a vibration transmitted from one of the two members to the other. More particularly, the present invention is concerned with a pneumatically operated active vibration damping device which includes an air chamber formed between the two members, for applying an oscillating force between the two members based on a periodic change of the air pressure in the air chamber.

2. Description of the Related Art

An active vibration damping device is known as one type of a vibration damping device, such as a vibration damping coupling (bushing) or mount, which is interposed between two members of a vibration system so as to flexibly connect these two members or mount one of these members on the other member in a vibration damping manner. Such an active vibration damping device, as disclosed in JP-A-60-8540 (publication of Japanese unexamined patent application), JP-A-61-2939 (publication of Japanese unexamined patent application), and JP-U-61-191543 (publication of Japanese unexamined utility model application), for example, includes: a first and a second mounting member which are spaced apart from each other; an elastic body elastically connecting the first and second mounting members; and an oscillating force generating device which is adapted to generate and apply an oscillating force between the two mounting members, thereby adjusting vibration damping characteristics of the vibration damping device. The active vibration damping device is operable to generate the oscillating force corresponding to the vibration to be damped, and apply the oscillating force to the vibration member whose vibration to be damped, so that the active vibration damping device is capable of eliminating or reducing the vibration to be damped by canceling the input vibration by the oscillating force, or is capable of actively adjusting spring characteristics thereof according to the input vibration so as to provide an increased vibration damping characteristics thereof. Thus constructed active vibration damping device is considered to apply as an engine mount or a body mount for an automotive vehicle.

There is also proposed an active vibration damping device of another type wherein an air chamber is formed between a first and a second mounting members and is alternately connected to a negative pressure source and an atmosphere by a switching operation of a first switch valve, causing the oscillating force based on a periodic change of the air pressure in the air chamber, at a frequency corresponding to the frequency at which the first switch valve is alternately placed in two operating positions, namely a "vacuum position" for communication of the air chamber with a vacuum source, and an "atmospheric position" for communication of the air chamber with the atmosphere. This pneumatically operated type of active vibration damping device does not require a heavy and complicated member such as an electromagnetic actuator to be incorporated therein, resulting in reduction in the number of the required components, the size and weight and the required amount of electric power consumption of the device.

In the pneumatically operated type of active vibration damping device constructed as described above, it is important and desirable to control the first switch valve and the negative pressure in the air chamber so that not only the frequency and phase but also the amplitude of the oscillating force correspond to those of the vibration to be damped, in order to improve the active damping effect with respect to the vibration of the vibratile member of the vibration system.

To meet the need indicated above, there is proposed to (a) detect the frequency, phase and amplitude of the vibration to be damped, by using a suitable sensor such as an accelerometer or acceleration sensor, or estimate those frequency, phase and amplitude according to predetermined data maps, (b) control the frequency and phase of the switching operation of the switching valve, so that the frequency and phase of the oscillating force correspond to those of the vibration to be damped, and (c) control the negative pressure in the air chamber so that the amplitude of the oscillating force corresponds to that of the vibration to be damped.

Where the pneumatically operated vibration damping device is used for an automotive vehicle, and the air intake system of the engine of the vehicle is used as the vacuum source, it is difficult to regulate the negative pressure in the air intake system as a vacuum source, and it is therefore difficult to obtain the oscillation force whose amplitude corresponds to that of the vibration to be damped. The active vibration damping device does not provide a sufficiently high active vibration damping effect, or may even deteriorate the vibrating condition of the vibration members, if the amplitude of the oscillating force does not accurately correspond to that of the vibration of the object.

SUMMARY OF THE INVENTION

It is therefore an object of this invention to provide a pneumatically operated active vibration damping device having a novel structure, which permits an easy regulation of an oscillating force by a simple mechanism, and which exhibits an excellent and stable vibration damping effect, corresponding to a change of an air pressure of an air source connected to a working air chamber thereof and a change of a frequency, phase and amplitude of the vibration to be damped.

The above object may be accomplished according to the principle of the present invention which provides a pneumatically operated active vibration damping device interposed between two members of a vibration system for connecting the two members in a vibration damping manner, comprising: (a) a first and a second mounting member which are spaced apart from each other and are attachable to the two members of the vibration system, respectively; (b) an elastic body elastically connecting the first and second mounting members; (c) a working air chamber adapted to apply an oscillating force between the first and second mounting members, based on a periodic change of an air pressure in the working air chamber; and (d) a volume regulator adapted to regulate a volume of the working air chamber.

In the pneumatically operated active vibration damping device of the present invention constructed according to the above mode of the present invention, the oscillating force applied between the first and second mounting member can be controlled by changing the volume of the working air chamber. Namely, the active vibration damping device of the present invention is operable to increase the volume of the working air chamber in which the periodic change of the air pressure is generated, so that the magnitude of the periodic change of the air pressure induced in the working air chamber can be substantially reduced, resulting in reduction in the magnitude of the oscillating force. On the other hand, the active vibration damping device of the present invention is also operable to decrease the volume of the working air chamber, so that the magnitude of the periodic change of the air pressure induced in the air chamber can be substantially increased, resulting in increment in the magnitude of the oscillating force. In the present preferred form of the invention, the working air chamber may be connected to at least one external air pressure source for thereby causing the periodic change of the air pressure in the working air chamber. Thus, the present active vibration damping device is capable of adjusting the magnitude of the oscillating force by changing the volume of the working air chamber, even in the case where the air pressure of the employed external air pressure source is a fixed value, for example. Alternatively, the present active vibration damping device is capable of maintaining or adjusting the oscillating force to be held substantially in constant by changing the volume of the working air chamber, even in the case where the air pressure of the employed air pressure sources changes. The "periodic change" of the air pressure in the working air chamber means that the air pressure in the air chamber increase and decrease repeatedly.

The volume, size and structure of the working air chamber are not particularly limited, but may be suitably determined in view of required vibration damping characteristics, required characteristics of the oscillating force, characteristics of the air pressure source, and the like. The volume of the working air chamber may be regulated or changed between two or more predetermined alternative values, by separating the working air chamber into two or more sections which are connectable via connecting means like valves, and connecting a suitable number of the sections for providing the working air chamber having a desired volume. Alternatively, the volume of the working air chamber may be regulated such that the working air chamber is partially defined by a movable plate which is displaced to change the volume of the working air chamber between two or more levels, or continuously. The periodic change of the air pressure in the air chamber may be induced between the atmospheric pressure and a negative or a positive pressure, or between the atmospheric pressure and the negative and the positive pressures. Preferably, the periodic change of the air pressure in the working air chamber may be induced by alternately connecting and disconnecting the air chamber to and from the atmospheric and negative pressure by means of a switching valve or the like, thereby applying alternately the atmospheric and negative pressure to the working air chamber.

According to one preferred form of the present invention, the volume regulator comprises an actuator which is operated based on a drive signal inputted thereto so as to change the volume of the working air chamber. In this preferred form of the present invention, the suitable driving signal is employed, permitting an automatic regulation or adjustment of the volume of the working air chamber. Preferably, the drive signal may consist of a suitable signal whose magnitude corresponds to that of the vibration to be damped and/or that of the periodic change of the air pressure applied to the working air chamber, so that the active vibration damping device according to the present preferred form of the invention is capable of exhibiting a desired active vibration damping effect with high stability, and regulating automatically the oscillation force generated therein. In this respect, the drive signal may be an electric signal, a pressure signal such as an air pressure signal, or, a hydraulic pressure signal, and the like.

On the other hand, the actuator may be selected from various kinds of conventional actuators, with the specific structure of the pressure regulator taken in account. For instance, the actuator may be consist of electrically operated actuators such as motors and solenoids, or may be consist of cylinder mechanism such as a pneumatic cylinder and a hydraulic cylinder. When the working air chamber consisting of two or more sections is employed in the active vibration damping device, the actuator indicated above is operated based on the driving signal so as to operate the switching valve to connect to and disconnect from the sections of the working air chamber, or so as to induce the displacement of the movable member partially defining the working air chamber, resulting in effective adjustment of the volume of the working air chamber.

In the above preferred form of this invention, the actuator may preferably be operated based on the drive signal consisting of the air pressure in the air chamber so as to change the volume of the air chamber corresponding to the air pressure in the working air chamber.

The pneumatically operated active vibration damping device according to this preferred form of the invention uses the air pressure in the working air chamber as the drive control signal applied to the actuator, eliminating requirement for detecting and transmitting means for detecting a signal corresponding to the vibration to be damped, resulting in a simple construction of the control system of the device. In particular, the present vibration damping device is very useful in the case where the magnitude of the vibration to be damped substantially corresponds to that of the air pressure applied to the air chamber from the specific air source.

The pneumatically operated actuator may preferably be comprises: a movable plate partially defining on one of opposite surfaces thereof the working air chamber and being displaceable in a predetermined direction; a biasing means adapted to bias the movable plate toward the inside of the working air chamber in the predetermined direction; and a drive air chamber partially defined by the other side of the movable member which is remote from the working air chamber, to which the same negative pressure as in the working air chamber is applied. In the pneumatically operated actuator constructed as described above, the position of the movable plate, that is, the volume of the working air chamber is determined based on a balance between the biasing force of the biasing means and a suction force of the negative pressure in the drive air chamber. That is, the position of the movable member, i.e., the volume of the working air chamber changes corresponding to the magnitude of the negative pressure applied to the working air chamber. The volume of the working air chamber is increased or decreased, as the magnitude of the negative pressure is increased or decreased, and accordingly the movable plate is moved toward and away from the working air chamber in the predetermined direction. This pneumatically operated actuator is arranged such that the movable plate is alternatively placed in two operating position, namely a "retracted position" for increasing the volume of the working air chamber and a "biased position" for decreasing the volume of the working air chamber. In this respect, the biasing force of the biasing means is suitably adjusted such that the movable plate is effectively and stably maintained in its "retracted position", when the value of the negative pressure applied to the working air chamber exceeds a predetermined threshold level, e.g., a significantly high level within the predetermined range of the value of the negative pressure. This means that the volume of the working air chamber is made large in the case where the negative pressure applied to the working air chamber is relatively high, whereby the oscillating force applied between the first and second mounting members is substantially held in constant, even if the negative pressure applied to the working air chamber is undesirably increased.

Preferably, the drive signal corresponds to a vibration to be damped, and the volume regulator is operated based on the drive signal such that the volume of the working air chamber changes in order to synchronize with the drive signal. In the pneumatically operated active vibration damping device constructed as described above, the volume of the working air chamber can be changed corresponding to the magnitude of the vibration to be damped, such that the volume of the working air chamber is made large for damping the vibration whose magnitude is relatively small, while being made small for damping the vibration whose magnitude is relatively large. The drive signal corresponding to a vibration to be damped is not particularly limited, but may preferably be a signal indicative of a rotational frequency of an engine, an acceleration signal, a wheel-speed signal, a wheel-speed acceleration signal, a signal indicative of the amount of opening of a throttle valve of the engine, a brake signal, a signal indicative of the currently selected position of the shift lever, when the present pneumatically operated active vibration damping device is applied to an engine mount, for example.

In particular, the pneumatically operated active vibration damping device constructed according to the above preferred form of the invention is suitably used to damp the vibration of the vehicle wherein are incorporated an internal combustion engine of direct-injection type which has a two kinds of operating modes, one of which is a so-called "stoichiometric" operating mode where the combustion is performed by using the fuel-air mixture, and the other is a so-called "direct-injection" operating mode where the combustion is performed such that a fuel is directly injected into a combustion chamber at a later stage of an air compression stroke. Namely, the vibration to be damped is relatively large when the internal combustion engine is in the direct-injection operating mode, while the negative pressure of a vacuum source of the engine intake is made small (close to the atmospheric pressure). On the other hand, the vibration to be damped is relatively small when the internal combustion engine is the stoichiometric operating mode, while the negative pressure of the vacuum source of the engine intake is made large. In this case, a signal indicative of changing between the stoichiometric operating mode and the direct-injection operating mode, is preferably employed as the drive signal corresponding to the vibration to be damped, so that the volume of the working air chamber is controlled to be changed such that the volume of the working air chamber is increased when the internal engine is in the stoichiometric operating mode, while being decreased when the internal engine is in the direct-injection operating mode, making it possible to exhibit a desired vibration damping effect of the present vibration damping effect.

According to a further preferred form of the present invention, the active vibration damping device further comprises an air piping system connected to the working air chamber so as to apply the periodic change of the air pressure to the working air chamber.

According to a yet further preferred form of the present invention, the working air chamber comprises: an oscillating air chamber adapted to apply the oscillating force between the first and second mounting members; and an volume regulating air chamber having a volume variable and being communicated with the oscillating air chamber through a connecting passage. In the presently preferred form of the invention, functional requirements of the working air chamber is effectively shared with the oscillating air chamber and the volume regulating air chamber, such that the oscillating air chamber is adapted to apply the oscillating force between the first and second mounting members, and the volume regulating air chamber is adapted to regulate the volume of the working air chamber. Further, the volume regulating air chamber can be formed to be independent of the oscillating air chamber of the vibration damping device, resulting in reduction in the size of the vibration damping device and a higher degree of freedom in determining a position of installation of the device.

In the above preferred form of the present invention, the volume regulating air chamber is connected to a portion of the air piping system. The pneumatically operated active vibration damping device constructed according to this preferred form of the invention, the pressure regulating chamber is independent of the vibration damping device having the first and second mounting members, so that the volume regulating air chamber can be installed at a portion of the air piping system which is remote from the potion of the vehicle on which the vibration damping unit is installed. Thus, the pneumatically operated active vibration damping device can be installed on the vehicle, while utilizing the space for the installation with high efficiency.

According to a still another preferred form of the invention, the active vibration damping device further comprise a pressure variation reducing device disposed in a portion of the air piping system for reducing a higher harmonics of the periodic change of the air pressure. Preferably, the volume regulating air chamber may comprise the pressure variation reducing device, such as a muffler for reducing an amount of variation of the air pressure in the air chamber. In this preferred form of the present invention, the volume regulating air chamber in the form of the muffler is capable of reducing a higher harmonics or a high frequency component of the periodic change of the air pressure applied to the working air chamber by resonance, resulting in improved accuracy of control of the oscillating force acting between the first and second mounting members, permitting an improved vibration damping effect.

According to yet another preferred form of the present invention, the pneumatically operated active vibration damping device further comprises a fluid chamber filled with a non-compressible fluid and is partially defined by the elastic body, and a movable member partially defining the fluid chamber on one of opposite sides thereof and the working air chamber on the other side thereof which is remote from the fluid chamber, the movable member being oscillated by the periodic change of the air pressure in the working air chamber so as to induce a pressure change of the fluid in the fluid chamber, for generating the oscillating force between the first and second mounting members.

In this arrangement, a periodic change of the air pressure in the working air chamber is transmitted between the first and second mounting member via a pressure change in the fluid chamber. This arrangement permits effective generation of the oscillating force acting between the first and second mounting members, based on the flow of the fluid within the fluid chamber, resulting in an improved vibration damping effect.

According to a yet another preferred form of the present invention, the pneumatically operated active vibration damping device further includes an equilibrium chamber partially defined by a flexible diaphragm and filled with the non-compressible fluid, and orifice defining member for defining an orifice passage for fluid communication between the equilibrium chamber and the fluid chamber. In this preferred from of the active vibration damping device, the fluid is forced to flow from the fluid chamber into the equilibrium chamber when an initial static load acts on the elastic body upon installation of the damping device. Accordingly, the volume of the equilibrium chamber is increased, preventing a rise of the fluid pressure in the fluid chamber due to the initial static load, resulting in exhibiting a desired vibration damping effect with high stability. In addition, the vibration damping device can also exhibit a passive vibration damping effect by utilizing the resonance of the fluid flowing through the orifice passage which is suitably tuned to a desired frequency band.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
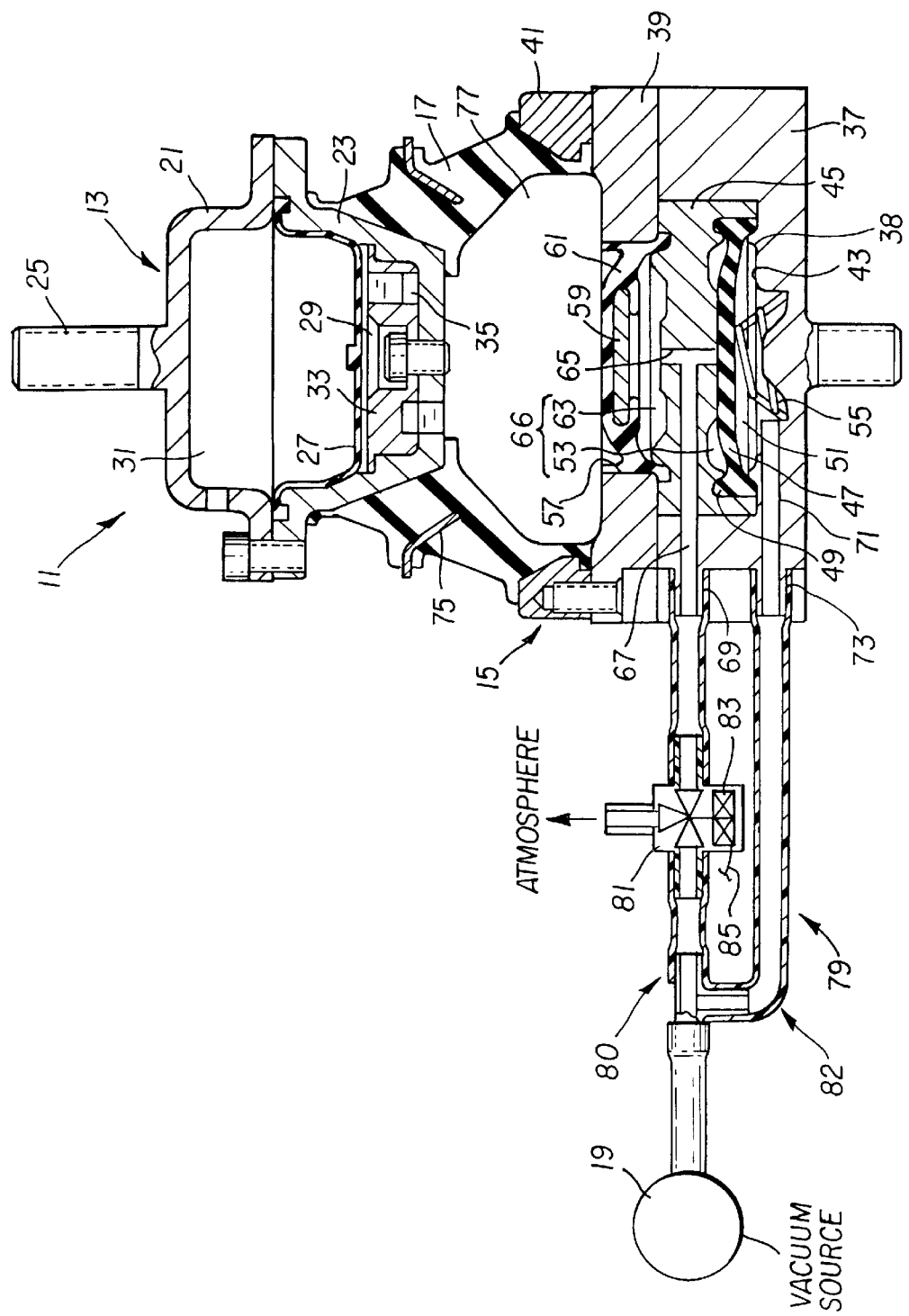
FIG. 1 is an elevational view in axial cross section of a pneumatically operated active vibration damping device in the form of an engine mount of an automotive vehicle, which is constructed according to one embodiment of this invention, together with a vacuum source used for the device.

Referring first to FIG. 1, there is illustrated the pneumatically operated active vibration damping device constructed according to a first embodiment of the present invention which includes an engine mount 11 and a drive system used for the engine mount 11. It is noted that FIG. 1 shows one of two operating modes of the engine mount 11. The engine mount 11 includes a first mounting member 13 and a second mounting member 15 which are made of metallic materials and are elastically connected to each other by an elastic body 17 such that the first and second mounting members 13, 15 are spaced apart from each other by a suitable distance in a vertical direction as seen in FIG. 1. The drive system, on the other hand, includes an air piping system connecting the engine mount 11 to a vacuum source 19 and the atmosphere. When the present engine mount 11 is installed on the vehicle, the first mounting member 13 is fixed to the power unit of the vehicle which includes an engine, while the second mounting member 15 is fixed to the vehicle body, so that the power unit is mounted on the vehicle body via the engine mount 11. In this condition, the engine mount 11 is alternately connected to the vacuum source 19 and the atmosphere so as to generate and apply an oscillating force between the first and second mounting members 13, 15, so that the engine mount 11 is capable of eliminating or reducing the vibration to be damped by canceling the input vibration by the oscillating force, or is capable of actively adjusting spring characteristics thereof according to the input vibration so as to provide an increased vibration damping characteristics thereof.

With the engine mount 11 installed on the vehicle, the weight of the power unit acts on the elastic body 17 as a static load, so that the elastic body 17 is elastically compressed in the vertical direction, and the first and second mounting members 13, 15 are displaced toward each other by a given distance. In this condition, a primary vibrational load to be damped acts on the engine mount 11 in the vertical direction in which the first and second mounting members are opposed to each other.

More specifically described, the first mounting member 13 is a hollow structure consisting of an upper member 21 and a lower member 23 which are both substantially cup-shaped metallic members each having at its open end a flange extending radially outwardly. The upper and lower members 21, 23 are butted and bolted together at their flanges so as to define an interior space. The upper member has a mounting screw 25 extending upwards from its bottom wall. The first mounting member 13 is fixed at its mounting screw 25 to the power unit of the vehicle (not shown).

Within the interior space of the first mounting member 13, there is disposed a cup-shaped flexible diaphragm 27 which is a relatively thin, easily displaceable or deformable film. The flexible diaphragm 27 is griped at its peripheral portion by and between the butted flanges of the upper and lower members 21, 23. The interior space of the first mounting member 13 is fluid-tightly divided by the flexible diaphragm 27 into two sections on the opposite sides of the flexible diaphragm 27. More specifically, the flexible diaphragm 27 cooperates with the lower member 23 to define an equilibrium chamber 29 which is filled with a non-compressible fluid and the volume of which is easily variable, while cooperating with the upper member 21 to define an air chamber 31 which communicates with the atmosphere and permits the flexible diaphragm 27 to be displaced. The non-compressible fluid may be water, alkylene glycol, polyalkylene glycol, silicone oil, or the like. To assure an excellent vibration damping effect of the engine mount 11 based on a flow of the non-compressible fluid, the non-compressible fluid desirably has a viscosity not higher than 0.1 Pa·s.

The first mounting member 13 also accommodates an orifice member 33 in the form of a circular disc superposed on and bolted to the bottom wall of the lower member 23. The orifice member 33 cooperates with the lower member 23 to define an orifice passage 35 serving as an orifice. The orifice passage 35 is formed so as to extend in the circumferential direction of the disc-like orifice member 33, over a circumferential length corresponding to an angle slightly smaller than 360°. The orifice passage 35 communicates at one end thereof with the equilibrium fluid chamber 29, and is open at the other end in the lower surface of the bottom wall of the lower member 23.

On the other hand, the second mounting member 15 comprises a bottom member 37, a support member 39 and a connecting ring 41, which are superposed on one another in the order of the description, in the vertical direction, and are bolted together. The bottom member 37 is a substantially cylindrical metallic member and has a center hole 38 open in its upper end face. A partition member 45 having a disc-like shape is forcibly pressed into the center hole 38, so as to close fluid tightly the opening of the center hole 38. Thus, the center hole 38 and the partition member 45 cooperate with each other to define an interior space 43 fluid-tightly enclosed within the bottom member 37.

Within the interior space 43, there is disposed a thin deformable rubber plate 47 having a disc-like shape, which is a relatively thin, displaceable rubber film. The rubber plate 47 has a flange portion 49 integrally formed at its outer peripheral portion with a relatively large thickness. The rubber plate 47 is gripped at the flange portion 49 by and between the bottom member 37 and the partition member 45. The interior space 43 of the bottom member 37 is fluid-tightly divided by the rubber plate 47 into two sections on the opposite sides of the rubber plate 47. The rubber plate 47 is elastically deformable toward and away from the bottom member 37 and the partition member 45.

Described more specifically, the rubber plate 47 cooperates with the bottom member 37 to define a switching air chamber 51 as a drive air chamber to which a negative pressure is applied, causing displacement of the rubber plate 47. Thus, the switching air chamber 51 functions as a pneumatically operated actuator adapted to generate displacement of the rubber plate 47. The rubber plate 47 also cooperates with the partition member 45 to define a volume regulating air chamber 53 the volume of which is variable depending upon an amount of displacement of the rubber plate 47. It is noted that the volume regulating air chamber 53 functions as a volume regulator. The switching air chamber 51 accommodates a coil spring 55 interposed between the rubber plate 47 and the bottom member 37. The coil spring 55 biases the rubber plate 47 in the direction away from the bottom wall of the bottom member 38 due to the spring force of the coil spring 55, so that the rubber plate 47 is forcedly placed onto the bottom surface of the partition member 45. In this respect, the material and the thickness of the rubber plate 47 are determined so as to provide a desired spring stiffness of the rubber plate 47, so that the spring force of the coil spring 55 is evenly applied to the entire area of the rubber plate 47, preventing partial or irregular deformation of the flexible diaphragm 47.

The support member 39 is an annular cylindrical member having a relatively large thickness, and has a center hole 57 passing therethrough in the axial direction. In the axially intermediate portion of the center hole 57 of the support member 39, there is disposed a circular-plate shaped oscillating plate 59 having a diameter considerably smaller than that of the center hole 57. The oscillating plate 59 is made of a hard material such as a metal or synthetic resin, and is supported by an annular elastic support 61, which is bonded at its inner and outer circumferential surfaces to the outer circumferential surface of the oscillating plate 59 and the inner circumferential surface of the center hole 57, respectively, in the process of vulcanization of a rubber material to form the elastic support 61. Thus, the oscillating plate 59 is supported by the support member 39 through the elastic support 61 such that the oscillating plate 59 is held by the elastic support 61, in its original or neutral position in which the elastic support 61 has substantially no internal strain, and such that elastic deformation of the elastic support 61 permits the oscillating plate 59 to be displaced and oscillated in the vertical direction.

Further, the opening of the center hole 57 of the support member 39 is fluid tightly closed by the oscillating plate 59 and the elastic support 61. The oscillating plate 59 and the elastic support 61 cooperate with the partition member 45 to define the fluid-tightly enclosed air chamber 63. In the partition member 45, there is formed a connecting passage 65 passing through the partition member 45 in the axial direction, which permits a communication between the air chamber 63 and the volume regulating air chamber 53 through the connecting passage 65. Thus, the air chamber 63 and the regulating air chamber 53 cooperate with each other to provide a working air chamber 66.

The second mounting member 15 has a first air passage 67 and a second air passage 71 both formed so as to extend in the radial direction. The first air passage 67 is open at one of its both ends in the inner circumferential surface of the connecting passage 65 and at the other end in the outer circumferential surface of the bottom member 37 at which a connector 69 is integrally formed so as to extends radially outwardly from the outer circumferential surface of the bottom member 37. That is, a periodic change of the air pressure applied from the atmosphere and the vacuum source 19 may be applicable through the first air passage 67 to the working air chamber 66 defined by the cooperation of the oscillating air chamber 63 and the volume regulating air chamber 53.

On the other hand, the second air passage 71 is open at one of its opposite ends in the switching air chamber 51 and at the other end in the outer circumferential surface of the bottom member 37 at which a connector 73 is integrally formed so as to extends radially outwardly from the outer circumferential surface of the bottom member 37. That is, a negative pressure of the vacuum source 19 may be applicable through the second air passage 71 to the switching air chamber 51.

The connecting ring 41 is an annular cylindrical member having a relatively large thickness and is made of a metallic material. The connecting ring 41 is superposed on and bolted to the outer peripheral portion of the upper end face of the support member 39 of the second mounting member 15.

The thus constructed first and second mounting members 13, 15 are spaced apart from each other by a suitable distance in a vertical direction such that the outer circumferential surface of the lower member 23 of the first mounting member 13 and the inner circumferential surface of the connecting ring 41 of the second mounting member 15 are opposite to each other in the direction inclined with respect to the vertical direction by a suitable amount of degree, so as to provide a tapered surfaces opposite to each other. The elastic body 17 is interposed between the first and second mounting member 13, 15 so as to elastically connect these two members.

The elastic body 17 is a relatively thick-walled hollow truncated conical member having an upper open end portion with a relatively small diameter and a lower open end portion with a relatively large diameter. In the process of vulcanization of a rubber material for forming the elastic body 17, the upper open end portion of the elastic body 17 is bonded at its inner circumferential surface to the tapered outer circumferential surface of the lower member 23, while the lower open end portion of the elastic body 17 is bonded at its outer circumferential surface to the tapered inner circumferential surface of the connecting ring 41. Thus, there is provided an elastically bonded intermediate assembly consisting of the first and second mounting members 13, 15 and the elastic body 17. To prevent irregular deformation of the elastic body 17 and prevent buckling thereof, a rigid restricting ring 75 is almost entirely embedded in an axially intermediate portion of the elastic body 17.

With the first and second mounting members 13, 15 elastically connected by the elastic body 17, the axially upper and lower open ends of the elastic body 17 is fluid tightly closed by the first and second mounting members 13, 15, respectively. That is, the first and second mounting members 13, 15 cooperate with the elastic body 17 to define a pressure receiving chamber 77 as a fluid chamber which is partially defined by the elastic body 17 and the oscillating plate 59, and filled with the non-compressible fluid described above, like the equilibrium chamber 29. The pressure receiving chamber 77 is communicated with the equilibrium chamber 29 through the orifice passage 35. Upon application of a vibrational load between the first and second mounting members 13, 15, the pressure of the fluid in the pressure receiving chamber 77 changes due to the elastic deformation of the elastic body. On the other hand, a fluid pressure change in the equilibrium chamber 29 is substantially absorbed by elastic deformation or displacement of the flexible diaphragm 27, which causes a change in the volume of the equilibrium chamber 29. Accordingly, there arises a difference between the fluid pressure in the two fluid chambers 29, 77, whereby the fluid is forced to flow between the two chambers 29, 77 through the orifice passage 35. As is well known in the art, the applied vibrations such as shake is effectively damped based on the resonance of the fluid flowing through the orifice passage 35. The provision of the equilibrium chamber permits the flow of the fluid between the pressure receiving chamber 77 and the equilibrium chamber 29 upon elastic deformation of the elastic body 17 due to the weight of the power unit, eliminating undesirable pressure change of the pressure receiving chamber, and preventing significant change of the spring characteristics of the mount 11 due to the pressure change of the pressure receiving chamber 77.

The engine mount 11 constructed as described above, is installed on the automotive vehicle and is connected with the air piping system 79 as shown in FIG. 1. Namely, the air piping system 79 is connected to the connectors 69, 73 provided on the bottom member 37 of the second mounting member 14, for connecting the oscillating air chamber 63 and the switching air chamber 51 to the predetermined air pressure sources. In the present embodiment, for example, the vacuum source 19 of the air intake system of the internal combustion engine of the vehicle and the atmosphere are used for providing two kinds of air pressure sources having different air pressure values. In particular, the internal combustion engine employed in the present embodiment is of a so-called "Direct-injection" type having a two kinds of operating modes, one of which is a so-called "Stoichiometric" operating mode wherein the combustion is performed by using a fuel-air mixture, and the other is a so-called "Direct-injection" operating mode wherein the combustion is performed by using the compressed air to which the fuel is directly injected. In the automotive vehicle using such an internal combustion engine, the value of the negative pressure in the vacuum source 19 and the amplitude of the vibration to be damped during the "Stoichiometric" operating mode is different from those values during the "direct-injection" driving mode.

The air piping system 79 includes a first air conduit 80 by which the oscillating air chamber 63 is connected to the vacuum source 19, and a second air conduit 82 branched from the first air conduit 80 by which the switching air chamber 51 is directly connected to the vacuum source 19. The first air conduit 80 is provided with a first switch valve 81 disposed between the oscillating air chamber 63 and the vacuum source 19 so that the oscillating air chamber 63 is alternately connected to and disconnected from the vacuum source 19 and the atmosphere. The first switch valve 81 may be a solenoid-operated switch valve having an electromagnetic actuator 83 which permits a switching operation of the first switch valve 81 at a high velocity according to an electric control signal applied through a conductor wire 85. The electric control signal has a high degree of correlation with the frequency and phase of the vibration to be damped, and may preferably be a signal generated by an ignition pulse sensor or the other sensors for detecting the vibration to be damped.

Figure 2:
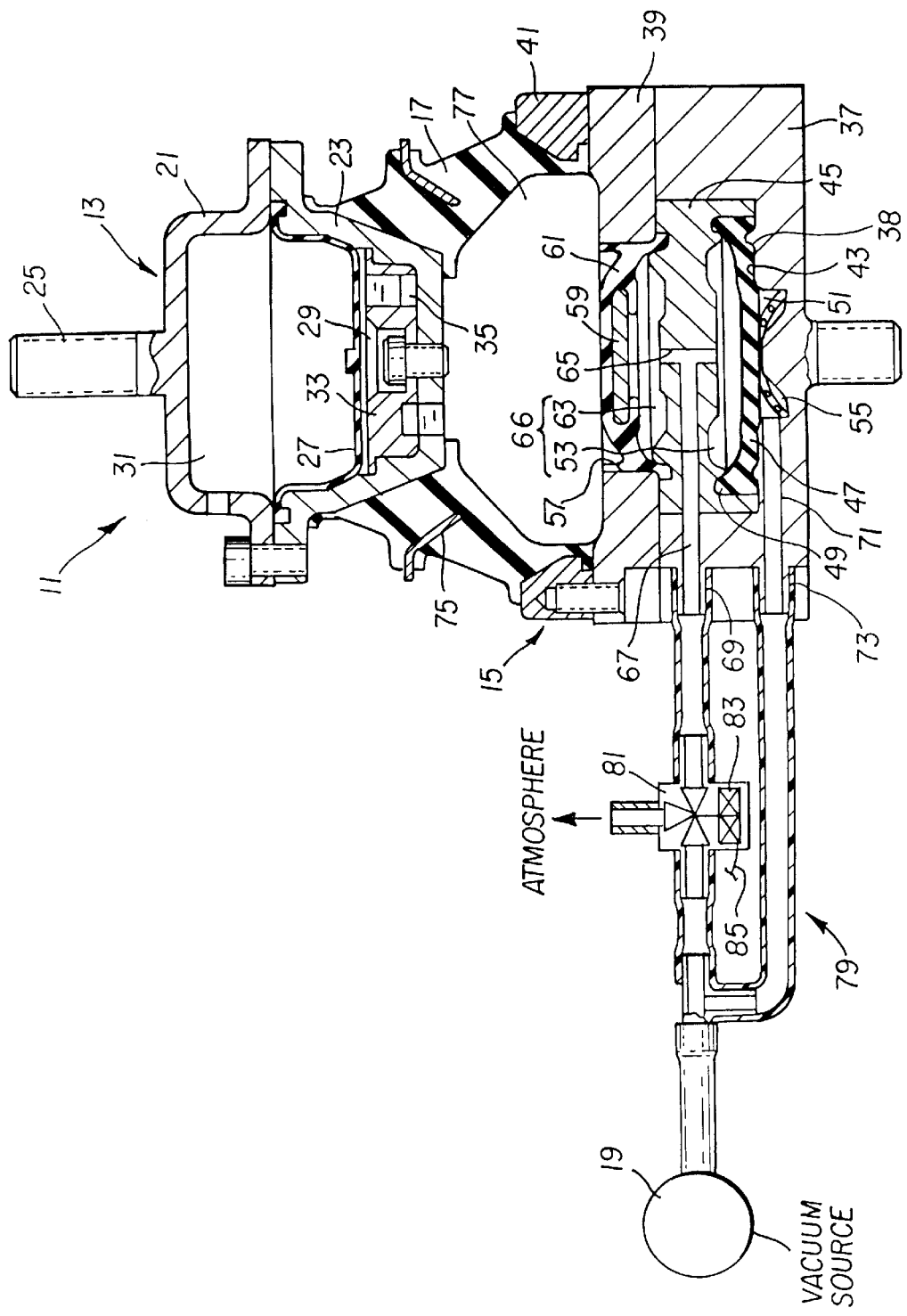
FIG. 2 is an elevational view in axial cross section of the engine mount of FIG. 1, showing another operating mode of the engine mount, which is different from that of FIG. 1.

Referring next to FIG. 2, there is illustrated the other operating modes of the engine mount 11, when the internal combustion engine is in the "Stoichiometric" driving mode wherein the absolute value of the negative pressure of the vacuum source 19 is considerably large. The relatively high negative pressure is applied to the rubber plate 47, so that the rubber plate 47 is attracted or retracted toward and is forcedly placed on the bottom surface of the center hole 38 of the bottom member 43, against the biasing force of the coil spring 55. In this condition, the volume regulating air chamber 53 is connected to the oscillating air chamber 63, thereby forming the working air chamber 66 having a maximum volume thereof.

When the internal combustion engine is in the direct-injection operating mode, on the other hand, the absolute value of the negative pressure of the vacuum source 19 is relatively low (close to the atmospheric pressure). The rubber plate 47 may not be attracted or retracted by the negative pressure applied thereto, and accordingly retained in its original position owing to the biasing force of the coil spring 55, namely, to be forcedly placed or putted on the bottom end face of the partition member 45 by the coil spring 55, as shown in FIG. 1, In the operating condition of FIG. 1, the lower end opening of the connecting passage 65 is fluid-tightly closed by the rubber plate 47, whereby the working air chamber 66 substantially consists only of the oscillating air chamber 63 so as to have a minimum volume thereof.

In the vibration damping device constructed according to the present embodiment, the volume of the working air chamber 66 can be automatically increased and decreased by the volume of the volume regulating air chamber 53, depending upon the selected driving mode of the internal combustion engine, since the volume regulating air chamber 53 is automatically connected to and disconnected from the oscillating air chamber 63 by the automatic displacement of the rubber plate 47 owing to pressure change of the negative pressure applied to the rubber plate 47, in other words, the pressure change in the vacuum source 19 depending upon the selected driving modes of the internal combustion engine.

In both cases of the stoichiometric and direct-injection operating modes of the direct-injection engine as discussed above, there is generated a periodic change of the air pressure in the working air chamber 66 which consists substantially of the switching air chamber 53 and the oscillating air chamber 63 in the stoichiometric operating mode, while, consisting only of the oscillating air chamber 63 in the direct-injection operating mode. The periodic change is generated by the switching operation of the first switch valve 81 so as to alternately apply a negative pressure and an atmospheric pressure to the working air chamber 66. The oscillating plate 59 partially defining the pressure receiving chamber 77 is oscillated by the periodic change of the air pressure in the working air chamber 66, so as to be displaced toward and away from the inside of the pressure receiving chamber 77 in the vertical direction of FIG. 1, whereby the pressure of the fluid in the pressure receiving chamber 77 is periodically changed, according to the amount of displacement of the oscillating plate 59. Accordingly, the pressure of the fluid in the pressure receiving chamber 77 is periodically changed so as to generate and transmitted an oscillating force between the first and second mounting members 13, 15, actively damping the vibration to be damped by canceling the vibration with the oscillating force, or so as to reduce an amount of change of the fluid pressure in the pressure receiving chamber 77, actively reducing the spring stiffness of the engine mount 11, resulting in exhibiting a sufficiently high vibration isolating effect. It is desirable that the engine mount 11 is arranged to exhibit the active vibration damping effects as described above with respect to the vibration whose frequency band is sufficiently higher than the frequency band to which the orifice passage 35 is tuned. This arrangement permits the vibration damping device 11 of the present embodiment exhibit a desired vibration damping effect, without adverse influence of the flow of the fluid flowing through the orifice passage 35.

The coil spring 55 may be arranged to apply to the rubber plate 47 a predetermined biasing force which is smaller than the suction force of the negative pressure of the vacuum source 19 during the stoichiometric operating mode of the internal combustion engine, and which is larger than the suction force of the negative pressure of the vacuum source 19 during the direct-injection driving mode of the internal combustion engine. In this respect, the biasing force of the coil spring 55 and the value of the negative pressure of the vacuum source 19 may be determined taken into account the elastic characteristics of the rubber plate 47, so as to assure that the rubber plate 47 is forcedly placed on the bottom surface of the partition member 45 when the internal combustion engine is in the direct-injection driving mode, and is forcedly placed on the bottom surface of the center hole 38 of the bottom member 37 when the internal combustion engine is in the stoichiometric operating mode, irrespective of the periodic change of the air pressure in the working air change 66 generated by the switching operation of the first switch valve 81.

In the engine mount 11 constructed according to the present embodiment, the negative pressure applied to the switching air chamber 51 is automatically changed depending on the selected driving mode of the internal combustion engine, causing the above-mentioned automatic volumetric change of the working air chamber 66 according to the selected operating mode of the engine. This means that the magnitude of the oscillating force generated between the first and second mounting members 13, 15 is suitably changed depending upon the selected operating mode of the internal combustion engine, owing to the change of the volume of the working air chamber 66 and the change of the value of the negative pressure of the vacuum source 19.

In the direct-injection driving mode as shown in FIG. 1, the working air chamber 66 is arranged to have its minimum volume substantially corresponding to that of the oscillating air chamber 63. This arrangement permits an efficient transmission or application of the atmospheric and negative air pressure to the working air chamber 66, when the working air chamber 66 is alternately connected to the atmosphere and the vacuum source, by the switching operation of the first switch valve 81, generating the periodic change of the air pressure in the working air chamber 66 whose amplitude is relatively large due to the pressure difference between the negative pressure and the atmospheric pressure. This periodic change of the air pressure in the working air chamber 66 is efficiently transmitted to the oscillating plate 59 so as to generate the oscillating force whose amplitude is accordingly relatively large. In the "Stoichiometric" driving mode as shown in FIG. 2, on the other hand, the working air chamber is arranged to have its maximum volume substantially corresponding to that of the oscillating and volume regulating air chambers 63, 53. This arrangement may reduce the efficiency of transmission of the atmospheric and negative air pressure to working air chamber 66, when the working air chamber 66 is alternately connected to the atmosphere and the vacuum source 19. That is, the magnitude of the periodic change of the air pressure in the working air chamber is made smaller than the actual pressure difference between these two air pressure, resulting in reduction of the efficiency of transmission of the atmospheric and negative air pressure to the oscillating plate 59.

There is known that when the internal combustion engine is in the "Stoichiometric" operating mode, the absolute value of the negative pressure of the vacuum source 19 is increased, while the generating vibration to be damped is relatively small. In this condition, the volume of the working air chamber is made maximum by the downward displacement of the rubber plate 47, since the negative pressure applied to the rubber plate 47 is larger than the biasing force of the coil spring 55, preventing an undesirable application of the oscillating force whose amplitude is unnecessarily large. On the other hand, when the internal combustion engine is in the "Direct-injection" operating mode, the absolute value of the negative pressure of the vacuum source 19 is decreased (close to the atmospheric pressure), while the generating vibration to be damped is relatively large. In this condition, the volume of the working air chamber is made minimum by the upward displacement of the rubber plate 47, since the negative pressure applied to the rubber plate 47 is smaller than the biasing force of the coil spring 55. With the reduced volume of the working air chamber 66, the periodic change of the air pressure in the working air chamber 66 is efficiently transmitted to the oscillating plate 59, generating the efficiently increased oscillating force by the oscillation of the oscillating plate 59. Thus, the engine mount 11 constructed as described above is capable of exhibiting desired vibration damping effect depending upon condition of the engine, or driving condition of the vehicle.

Figure 3:
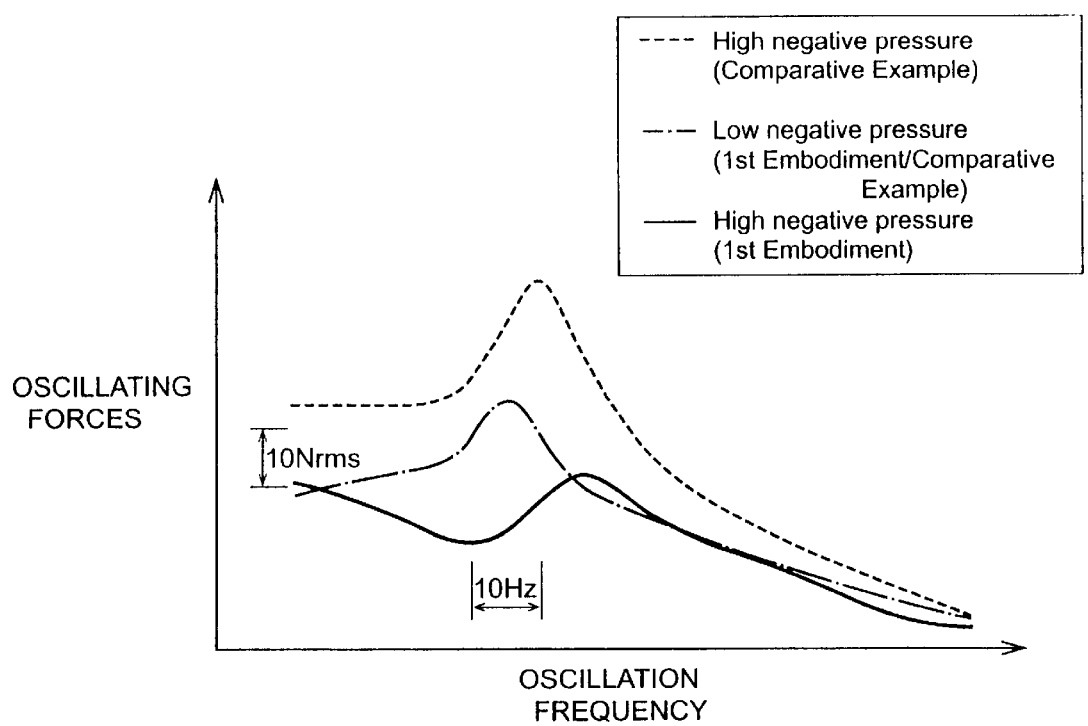
FIG. 3 is a graph indicating a relationship between an oscillating force generated in the engine mount of FIG. 1 and a frequency of a periodic change of an air pressure applied to the engine mount, as compared with relationship of comparative example.

The engine mount 11 is operated and the actual oscillating forces generated during the stoichiometric and direct-injection driving modes were measured with respect to the oscillation frequency of the oscillating plate 59. The measurement are indicated in the graph of FIG. 3, wherein "High negative pressure" indicates the measurement of the stoichiometric driving mode, while "Low negative pressure" indicates the measurement of the direct-injection driving mode. The graph of FIG. 3 reveals that the engine mount 11 of the present embodiment is capable of reducing the oscillating force to the desired level during the stoichiometric operating mode where the negative pressure of the vacuum source 19 is relatively high. The engine mount 11 is also operated with the second air passage 71 closed, so as to provide an active vibration damping device of conventional type wherein the volume of the working air chamber 66 is constant. The actual vibration damping effects during the stoichiometric and direct-injection driving modes were measured with respect to the oscillation frequency of the oscillation plate 59. The measurement are also indicated in the graph of FIG. 3. As is apparent from the measurement of the conventional-type active vibration damping device, the engine mount 11 of the present embodiment is capable of exhibiting desired vibration damping effect depending on the selected operating modes of the internal combustion engine, in other words, depending on the absolute value of the negative pressure of the vacuum source 19, whereas the vibration damping effect of conventional damping device may be deteriorated when the absolute value of the negative pressure of the vacuum source 19 is relatively high.

In the engine mount 11 constructed according to the present embodiment, the volume regulating air chamber is accommodated within the engine mount 11, leading to easy handing of the mount. Further the required length of the connecting passage 65 for a fluid communication between the oscillating air chamber 63 and the volume regulating air chamber 53 is relatively small, providing the working air chamber 66 having a substantially single structure.

In the engine mount 11 of the present embodiment, the operating positions of the rubber plate 47, in other words, the upper-end and lower-end positions of the vertical displacement of the rubber plate 47 are accurately defined by the bottom end face of the bottom member 37 and the bottom surface of the center hole 38 of the bottom member 37, respectively, assuring stable generation of a desired oscillating force of the engine mount 11. In addition, the volume of the working air chamber 66 is easily and stably decreased by the volume corresponding to that of the volume regulating air chamber 53, by only closing the lower end opening of the connecting passage 65 with the rubber plate 47, so that the volume of the working air chamber 66 is effectively and stably minimized.

In the engine mount 11 of the present embodiment, the oscillating air chamber 63 and the volume regulating air chamber 53 are formed independently from each other and are held in communication with each other through the connecting passage 65. The engine mount 11 of the present embodiment may be modified such that the oscillating air chamber 63 and the volume regulating air chamber 53 are formed to be incorporated within a single chamber. In this case, the partition member 45 is provided with a plurality of connecting passages formed therethrough, each passages having a relatively large cross sectional area and disposed within the working air chamber 66, so that the upper-end position of the displacement of the rubber plate 47 is suitably defined by an abutting contact of the rubber plate 47 with the lower end face of the partition member 45. This arrangement ensures accurate positioning of the rubber plate 47, when the volume of the working air chamber 66 is reduced.

Figure 4:
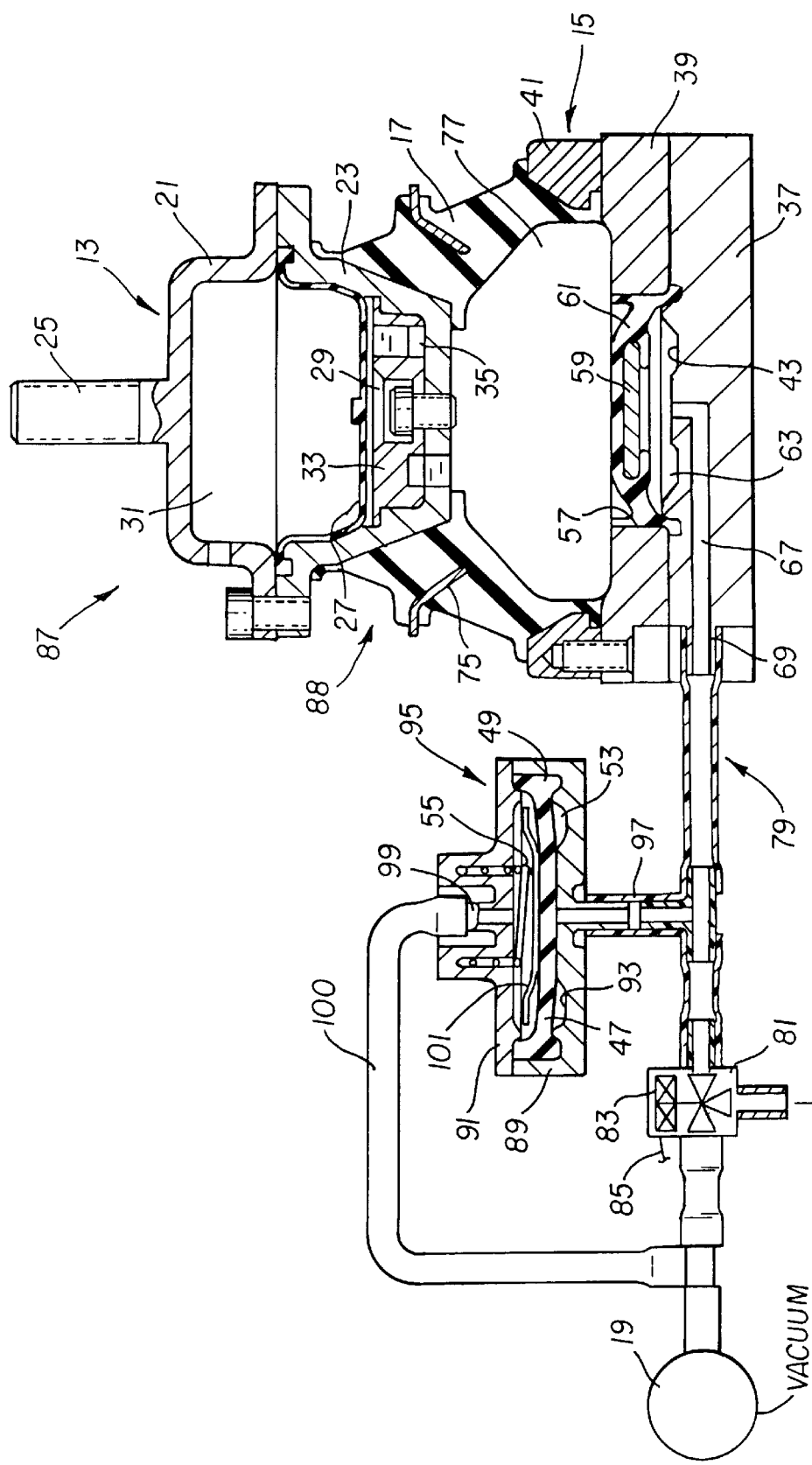
FIG. 4 is an elevational view in axial cross section of a pneumatically operated active vibration damping device in the form of an engine mount constructed according to a second embodiment of the invention.

While the engine mount 11 of the present embodiment includes the volume regulating air chamber 53 formed incorporated therein, it may be possible to form the volume regulating air chamber 53 independently and separately from the engine mount 11. One example of this type of the engine mount is illustrated in FIG. 4, as the second embodiment of the present invention. In the second embodiment of FIG. 4, the same reference numerals as used in the first embodiment of FIGS. 1 and 2 will be used to identify the elements which are the same as or similar to those in the first embodiment. No redundant description of elements will be provided, in the interest of simplification of the description.

The engine mount 87 according to the second embodiment of the present invention includes a mount unit 88 including the first and second mounting members 13, 15 which are elastically connected with the elastic body 17 interposed therebetween and an air chamber unit 95. In the present engine mount 87, the oscillating air chamber 63 is formed within the second mounting member 15, while the volume regulating air chamber 53 is formed to be independent of the mount unit 88. More specifically described, an air chamber unit 95 in the form of a hollow cylindrical case made of metal is independently formed for providing therein the volume regulating air chamber 53. The air chamber unit 95 comprises a housing member 89 having a cup shape and a disk-like closure plate 91 which is superposed on the upper end face of the housing member 89 so as to close the opening of the housing member 89, thereby defining an interior space 93 within the case 95. The rubber plate 47 is elastically deformably accommodated in the interior space 93 such that the rubber plate 47 is griped at the flange portion 49 by and between the housing member 89 and the closure plate 91. The interior space 93 of the air chamber unit 95 is fluid-tightly divided by the rubber plate 47 into two sections on the opposite sides of the rubber plate 47. The rubber plate 47 cooperates with the housing member 89 to define the volume regulating air chamber 53, while cooperating with the closure plate 91 to define the switching air chamber 53. The volume regulating air chamber 53 is connected to the air piping system 79 via the branched air conduit 97 formed at a portion between the switching valve 81 and the working air chamber 63. Thus, the negative pressure of the vacuum source 19 is applied to the switching air chamber 53 as well as the oscillating chamber 63. The switching air chamber 51 is directly communicate with the vacuum source 19 via a connector 99 formed at and open in the upper surface of the closure plate 91 and a by-passed air conduit 100 the opposite ends of which are connected to the connector 99 and a portion of the air piping system 79 between the vacuum source 19 and the switching valve 81. In the switching air chamber 51 of the present embodiment, there is accommodated a restricting plate 101 by which the rubber plate 47 is forcedly placed on the bottom surface of the housing member 89. The restricting plate 101 is a plate like member having a thin thickness and made of a hard material such as metal. The provision of the restricting plate 101 increase a stability of the attitude of the rubber plate 47, ensuring improved operation stability and durability of the engine mount 87.

The engine mount 87 constructed according to the present embodiment is capable of exhibiting a high vibration damping effect as in the first embodiment. Further, the engine mount 87 has the volume regulating air chamber 53 formed in the air chamber unit 95 which is independent of the mount unit 88, resulting in reduction of the size of the mount unit 88, and resulting in a higher degree of freedom in determining a position of installation of the volume regulating air chamber unit 95. In this respect, the air piping system 79 may suitably be arranged taking into account the positioning relationship between the mount unit 88 and the air chamber unit 95. This arrangement permits a higher degree of freedom in determining the position of installation of the engine mount 87, and makes it possible to install the engine mount 87 with high space utilizing efficiency.

Figure 5:
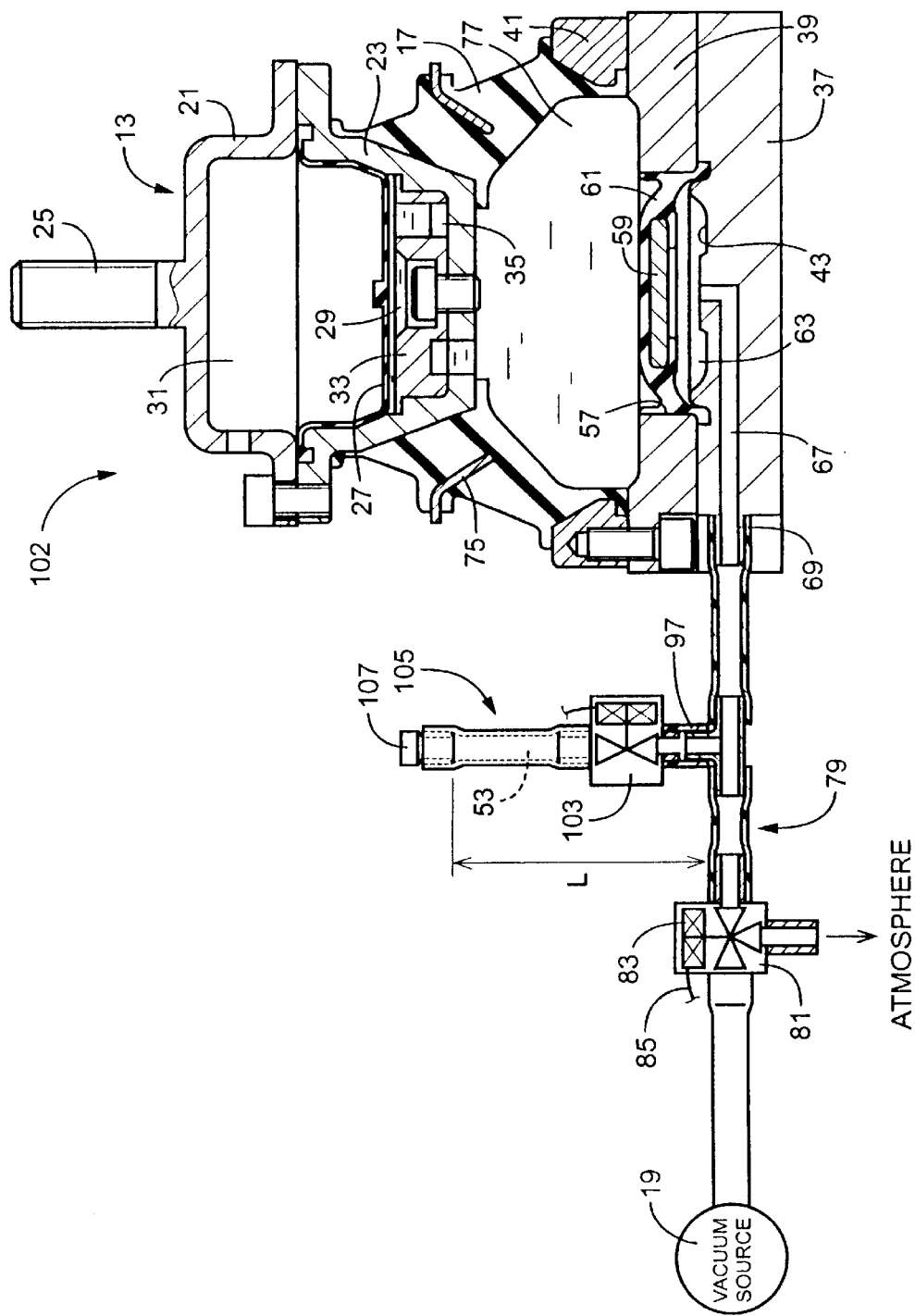
FIG. 5 is an elevational view in axial cross section of a pneumatically operated active vibration damping device in the form of an engine mount constructed according to a third embodiment of the invention.

In the first and second embodiments of the present invention as described above, the volume of the working air chamber 66 is regulated according to the magnitude of the vibration of the vibratile member, e.g., the power unit, by using the switching air chamber 51 functioning as a pneumatic-type actuator operated by the negative pressure of the vacuum source 19 applied thereto. The mechanism for regulating the volume of the working air chamber 66 may otherwise be arranged. For instance, one example of this type of the engine mount is illustrated in FIG. 5, as the third embodiment of the present invention. In the third embodiment of FIG. 5, the same reference numerals as used in the second embodiment of FIG. 4 will be used to identify the elements which are the same as or similar to those in the second embodiment.

Referring to FIG. 5, there is illustrated the engine mount 102 constructed according to the third embodiment of the present invention. In the engine mount 102, a tubular structure 105 is connected to a portion of the air piping system 79 between the first switch valve 81 and the oscillating air chamber 63. This tubular structure 105 has a suitable length and connected to a branched conduit 97 via a second switch valve 103. The tubular structure 105 is gas-tightly closed at its end remote from the branched conduit 97 by means of a closure member 107. When the second switch valve 103 is placed in its open position, the branched passage 97 and the tubular structure 105 are communicated with each other and cooperate to define the volume regulating air chamber 53 in the form of a muffler branched from the air piping system 79 and having a suitable length L.

The volume regulating air chamber 53 constructed as described above is connected to or disconnected from the oscillating air chamber 63 through the second switch valve 103 and the air piping system 79, by a switching operating of the second switch valve 103, so that the volume of the working air chamber 66 is increased or decreased, by the amount of the volume of the volume regulating air chamber 53. In the present embodiment, the second switch valve 103 is operated by an electric control signal corresponding to a signal indicative operating condition of the internal combustion engine. Thus, the engine mount 102 of the present embodiment is capable of exhibiting high vibration damping effect as in the second embodiment.

The volume regulating air chamber 53 in the form of the muffler is effective to reduce the air pressure variation whose frequency correspond to the length L, based on the resonance. Thus, the length L is determined depending upon the vibration to be damped, namely, higher harmonics of the oscillation frequency of the oscillating plate 59. With the muffler whose length is desirably adjusted, the engine mount 102 of the present embodiment is capable of exhibiting high vibration damping effect with high accuracy. The volume of the volume regulating air chamber 53, in other words, the amount of change of the volume of the working air chamber 66 may suitably be arranged by adjusting the cross sectional area of the tubular structure 105.

While the volume of the working air chamber 66 is switched between two alternatives, i.e., the maximum and minimum volumes thereof, in the aforementioned embodiments, the working air chamber may be arranged to have three or more alternatives of different volumes thereof.

Figure 6:
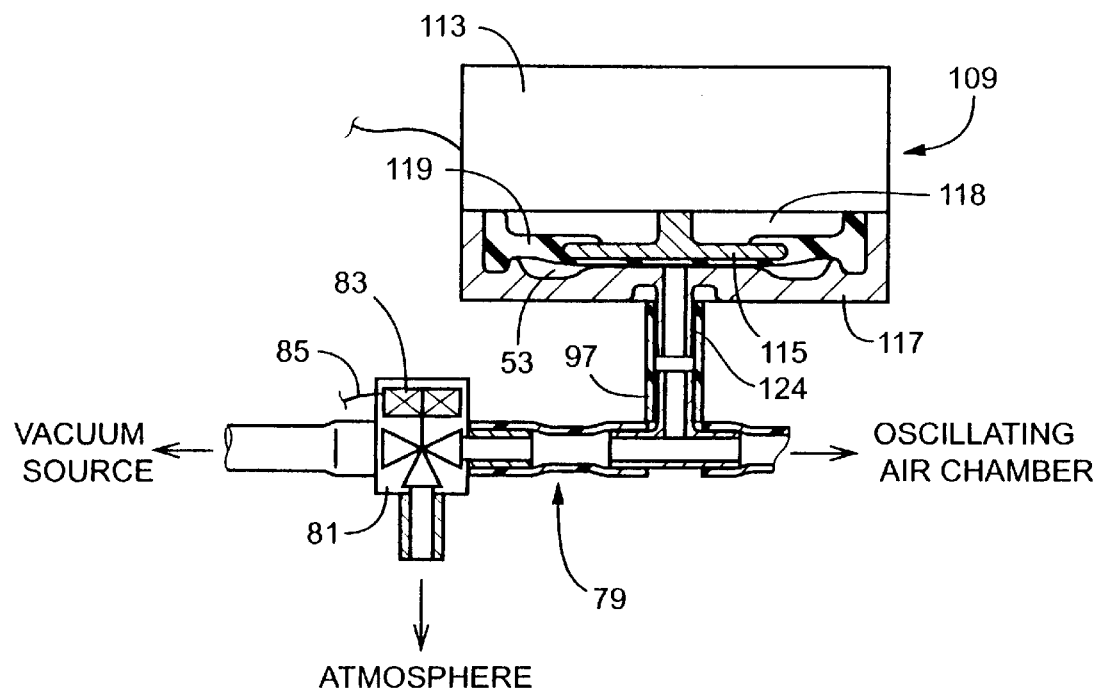
FIG. 6 is an elevational view in axial cross section of a part of a pneumatically operated active vibration damping device constructed according to a fourth embodiment of the invention.
Figure 7:
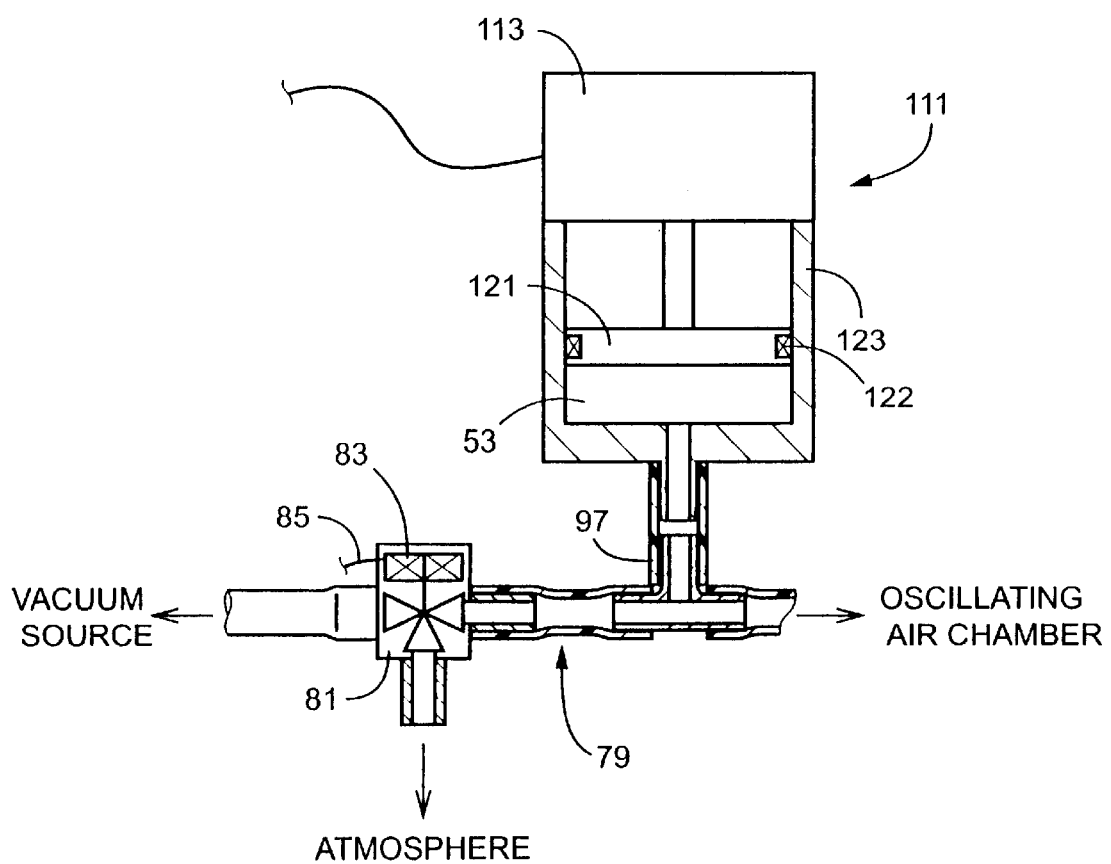
FIG. 7 is an elevational view in axial cross section of a part of a pneumatically operated active vibration damping device constructed according to a fifth embodiment of the invention.

Referring next to FIGS. 6 and 7, there are illustrated pneumatically operated active vibration damping devices constructed according to the fourth and fifth embodiments of this invention, wherein the engine mount unit 87 is identical with that in the second embodiment of FIG. 4.

In the present fourth embodiment of FIG. 6, a volume regulator unit 109 of cylinder type includes a driving mechanism 113 such as an electric motor and an electromagnetic actuator, and a cup shaped housing member 117. The driving mechanism 113 is superposed on the housing member 117 to thereby close the opening of the housing member 117 and define therebetween an interior space 118. The interior space 118 accommodates a disk-like piston plate 115 and a thin-annular elastic support 119. The piston plate 115 is bonded to the output shaft of the driving mechanism 113 so that the piston plate 115 is reciprocally movable in the vertical direction of FIG. 6. The elastic support 119 is bonded at its inner and outer circumferential surfaces to the outer circumferential surface of the piston plate 115 and the inner circumferential surface of the housing member 117, respectively, in the process of vulcanization of a rubber material to form the elastic support 119. Thus, the opening of the housing member 117 is fluid-tightly closed by the piston plate 115 and the elastic support 119, whereby is provided the air pressure regulating chamber 53 which is connected to the branched passage 97 through a connector 124 formed on the bottom surface of the housing member 117. In a volume regulator unit 109 constructed as described above, the piston plate 115 is displaceable in the axial direction, i.e., the vertical direction of FIG. 6 by the operation of the driving mechanism 113, effectively and easily providing the air pressure regulating chamber 53 whose volume is continuously changeable.

In the present fifth embodiment of FIG. 7, a volume regulator unit 111 of cylinder type includes a cup shaped housing member 123 on which the driving mechanism 113 is superposed, and a piston 121 is slidably received by the inner surface of the housing member 123. The piston 121 includes a seal ring 122 provided on the outer circumferential surface of the piston 121, so that the opening of the housing member 123 is fluid-tightly closed by the piston 121, whereby is provided the air pressure regulating chamber 53 defined by the inner surface of the housing member 123 and one of opposite surfaces of the piston 121 remote from the actuator 113. As is apparent from FIG. 7, the volume regulator unit 111 of the present embodiment permits more stable and precise regulation of the volume of the volume regulating air chamber 53, that is, the volume of the working air chamber 66, over a wider range, in comparison with the volume regulating unit 109 of the fourth embodiment.

It is noted that the volume regulator units 109, 111 as shown in FIGS. 6 and 7, respectively, may also be operable by the electric control signal whose components correspond to that of the vibration to be damped, so that the volume regulating air chamber 53 changes depending upon the condition of the vibration to be damped. Thus, the vibration damping devices constructed according to the fourth and fifth embodiments of this invention is capable of exhibiting high vibration damping effect as in the second embodiment of the invention.

While the present invention has been described in detail with its preferred embodiments with certain degrees of particularity, it is to be understood that the invention is not limited to the details of the illustrated embodiments, but may be otherwise embodied.

For instance, the working air chamber 66 may be constructed as a single air chamber formed within the engine mount and may accommodate the volume regulator unit 109, 111 of piston type as shown in FIGS. 6 and 7, so that the volume of the air chamber can be changed continuously or between alternatives of different volumes thereof.

In the illustrated embodiments, the oscillating force is generated by utilizing the pressure difference between the atmospheric pressure and the negative pressure which is available on any motor vehicle having an internal combustion engine, that is, the negative pressure in the air intake system of the engine. The present invention does not limited to the illustrated embodiments, and may be embodied so as to utilize any other two or more pressure sources whose values of pressure are different from each other. For instance, the combination of atmospheric pressure and a positive pressure having a pressure value higher than that of the atmospheric pressure may be employed.

In the vibration damping devices constructed according to the second, third, fourth and fifth embodiments as illustrated in FIGS. 4–7, respectively, the volume regulating air chamber 53 is connected to the air piping system 79 at a portion between the first switching valve 81 and the oscillating air chamber 63, so that the air pressure regulating chamber 53 can effectively exhibit a desired pressure regulating capacity thereof. With respect to the volume regulator units 109, 111 of FIGS. 6 and 7, it may be possible to connect these volume regulator units 109, 111 to the air piping system 79 at a portion between the first switch valve 81 and the vacuum source 19.

While each of the illustrated engine mount of the present invention includes the pressure receiving chamber 77 which is partially defined by the elastic body 17 and the oscillating plate 59, the engine mount of the invention may further includes an auxiliary fluid chamber divided from the pressure receiving chamber 77 by a partition member supported by the second mounting member 14, and partially defined by the oscillating plate 59. The auxiliary fluid chamber is held in fluid communication with the pressure receiving chamber 77 through the fluid passage, so that the periodic pressure change generated in the auxiliary fluid chamber due to the oscillation of the oscillating plate 59 is transmitted to the pressure receiving chamber by the flow of the fluid passing through the fluid passage. In this case, the amount of flow of the fluid through the fluid passage can be effectively increased by the oscillation of the oscillating plate 59 based on the resonance of the fluid flowing through the fluid passage. Thus constructed engine mount is capable of exhibiting oscillating force having larger amplitude and reducing the pressure of the fluid in the pressure receiving chamber.

It is noted that the present invention does not necessarily require a fluid chamber filled with a non-compressible fluid. For instance, the engine mount according to the present invention may be constructed such that the periodic change of the air pressure of the working air chamber is directly applied between the first and second mounting members 13, 15 so as to generate the oscillating force therebetween.

In the illustrated embodiments, the present invention is applied to one type of the engine mount wherein the first and second mounting members 13, 15 are opposite to each other with a suitable amount of spacing, in one direction, e.g., a vertical direction. The present invention may be applicable to other types of the engine mounts, for instance, to a engine mount for a FF (front-engine/front-drive) motor vehicle, which includes an inner sleeve member and an outer sleeve member disposed radially outwardly of the center shaft, that are elastically connected with each other by an elastic body interposed therebetween.

While the present invention is applied to the engine mount for a motor vehicle in the illustrated embodiments, the principle of the present invention may also be applicable to other types of active vibration damping device for vehicles, such as vehicle body mounts and differential mounts and active vibration damping devices used in various equipment or systems other than those for motor vehicles.

It is to be understood that the present invention may be embodied with various other changes, modifications and improvements, which may occur to those skilled in the art, without departing from the spirit and scope of the invention defined in the following claims:

What is claimed is:

1. A pneumatically operated active vibration damping device interposed between two members of a vibration system for connecting said two members in a vibration damping manner, said active vibration damping device comprising:

a first and a second mounting member which are spaced apart from each other and are attachable to said two members of said vibration system, respectively;

an elastic body elastically connecting said first and second mounting members;

a working air chamber adapted to apply an oscillating force between said first and second mounting members, based on a periodic change of an air pressure in said working air chamber; and a volume regulator adapted to regulate a volume of said working air chamber so as to regulate an amplitude of said periodic change of said air pressure in said working air chamber.

2. A pneumatically operated active vibration damping device according to claim 1, wherein said working air chamber being connected to an external air pressure source whose pressure value changes, said volume regulator being operated to increase the volume of said working air chamber when an absolute pressure value of said external air pressure source is higher than a predetermined value, and to decrease the volume of said working air chamber when the absolute pressure value of said external air pressure sources is lower than said predetermined value.

3. A pneumatically operated active vibration damping device according to claim 1, wherein said working air chamber being connected to a vacuum pressure source of an internal combustion engine of direct-injection type having two operating modes of a stoichiometric operating mode and a direct-injection operating mode, said volume regulator being operated to increase the volume of said working air chamber when said internal combustion engine is in said Stoichiometric operating mode, and to decrease the volume of said working air chamber when said internal combustion engine is in said direct-injection operating mode.

4. A pneumatically operated active vibration damping device according to claim 1, further comprising a first switch valve connected to said working air chamber and connecting said working air chamber alternately to at least two external air pressure sources having respective pressure values different from each other for thereby causing said periodic change of the air pressure in said working air chamber, one of said at least two external air pressure sources being an atmosphere.

5. A pneumatically operated active vibration damping device according to claim 1, wherein said volume regulator comprises an actuator being operated based on a drive signal inputted thereto so as to change the volume of said working air chamber.

6. A pneumatically operated active vibration damping device according to claim 5, wherein said actuator is operated based on said drive signal consisting of the air pressure in said working air chamber so as to change the volume of said air chamber corresponding to the air pressure in said working air chamber.

7. A pneumatically operated active vibration damping device according to claim 5, wherein said drive signal corresponds to a vibration to be damped, and said volume regulator is operated based on said drive signal such that the volume of said working air chamber changes in order to synchronize with said drive signal.

8. A pneumatically operated active vibration damping device according to claim 5, wherein said actuator comprises: a movable plate partially defining on one of opposite surfaces thereof said working air chamber which is displaced to change the volume of said working air chamber; a biasing means adapted to bias the movable plate toward one of opposite side thereof; and a drive air chamber partially defined by the other side of said movable plate remote from the working air chamber and connected to an external air pressure source so as to apply an air pressure to said movable plate for displacing said movable plate toward the other side thereof.

9. A pneumatically operated active vibration damping device according to claim 5, wherein said actuator comprises an electrically operated reciprocatively movable piston.

10. A pneumatically operated active vibration damping device according to claim 1, wherein said working air chamber comprises: an oscillating air chamber adapted to apply said oscillating force between said first and second mounting members; and an volume regulating air chamber whose volume is variable, said oscillating air chamber and said volume regulating air chamber being communicated with each other through a connecting passage.

11. A pneumatically operated active vibration damping device according to claim 10, further comprising a second switch valve connecting and disconnecting said volume regulating air chamber to and from said oscillating air chamber, so as to regulate the volume of said working air chamber.

12. A pneumatically operated active vibration damping device according to claim 10, further comprising an air piping system connected to said working air chamber so as to apply said periodic change of the air pressure, said volume regulating air chamber being connected to a portion of said air piping system.

13. A pneumatically operated active vibration damping device according to claim 12, further comprising a first switch valve connected to said air piping system and connecting said working air chamber alternately to at least two external air pressure sources having respective pressure values different from each other, said volume regulating air chamber being connected to a portion of said air piping system between said working air chamber and said first switch valve.

14. A pneumatically operated active vibration damping device according to claim 10, further comprising pressure variation reducing device disposed in a portion of said air piping system for reducing a higher harmonics of said periodic change of the air pressure.

15. A pneumatically operated active vibration damping device according to claim 14, wherein said pressure variation reducing device comprises a muffler.

16. A pneumatically operated active vibration damping device according to claim 1, further comprises a fluid chamber filled with a non-compressible fluid and partially defined by said elastic body, and a movable member partially defining said fluid chamber on one of opposite sides thereof and said working air chamber on the other side thereof which is remote from said fluid chamber, said movable member being oscillated by said periodic change of said air pressure in said working air chamber so as to induce a pressure change of said fluid in said fluid chamber, for generating said oscillating force between said first and second mounting members.

17. A pneumatically operated active vibration damping device according to claim 16, further comprises an equilibrium chamber partially defined by a flexible diaphragm and filled with said non-compressible fluid, and orifice defining member for defining an orifice passage for fluid communication between said equilibrium chamber and said fluid chamber.

18. A pneumatically operated active vibration damping device according to claim 16, said movable member includes an elastic member which produces an elastic force for restoring said movable member to an original position thereof.

19. A pneumatically operated active vibration damping device according to claim 16, further comprising an auxiliary fluid chamber divided from said fluid chamber by a partition member supported by said second mounting member and partially defined by said movable member, said auxiliary fluid chamber being held in fluid communication with said fluid chamber through a fluid passage formed through said partition member, said movable member being oscillated by said periodic change of said air pressure in said working air chamber so as to induce a pressure change of said fluid in said auxiliary fluid chamber, said pressure change of said auxiliary fluid chamber being transmitted to said pressure receiving chamber by a flow of the fluid flowing through said fluid passage.

* * * * *